United States Patent

Kosco

[11] Patent Number: 6,058,436
[45] Date of Patent: May 2, 2000

[54] QUICK ARBITRATION AND SELECT (QAS) PROTOCOL IN SCSI INTERFACE FOR CONFIGURING A CURRENT TARGET DEVICE TO ASSERT A QAS MESSAGE CODE DURING A MESSAGE-IN PHASE

[75] Inventor: Michael T. Kosco, Newport Beach, Calif.

[73] Assignee: Adaptec, Inc., Milpitas, Calif.

[21] Appl. No.: 09/098,214

[22] Filed: Jun. 16, 1998

Related U.S. Application Data

[60] Provisional application No. 60/049,726, Jun. 16, 1997.
[51] Int. Cl.⁷ .............................. G06F 13/42; G06F 13/36
[52] U.S. Cl. ................................ 710/11; 710/10; 710/16; 710/17; 710/118; 710/125; 710/240
[58] Field of Search ..................................... 710/240, 242, 710/11, 16, 119, 105, 113, 118, 125, 241, 15, 17, 10; 709/235

[56] References Cited

U.S. PATENT DOCUMENTS

| | | | |
|---|---|---|---|
| 5,204,591 | 4/1993 | Kaitandjian et al. | 318/106 |
| 5,257,356 | 10/1993 | Brockmann et al. | 710/110 |
| 5,613,076 | 3/1997 | Latif et al. | 710/113 |
| 5,845,154 | 12/1998 | Krakirian | 710/74 |

Primary Examiner—Thomas C. Lee
Assistant Examiner—Ilwoo Park
Attorney, Agent, or Firm—Christie, Parker & Hale, LLP

[57] ABSTRACT

An SCSI quick arbitration and select protocol reduces the timing overhead associated with multiple, sequential data transfer operations, thereby significantly increasing bus efficiencies and average throughput. The conventional arbitration and selection phases are collapsed into a quick arbitrated and select phase, whereby the current SCSI target hosts an arbitration proceeding without the bus transitioning to a bus free phase. The quick arbitrate and select phase is invoked by a current target device by broadcasting a QAS message code during the message-in phase of the current process. QAS capable devices snoop the bus, recognize the QAS message code and enter a quick arbitrate and select phase. A fairness algorithm grants control of the bus to a participating QAS target with the next lowest SCSI ID from that of the current QAS target.

5 Claims, 6 Drawing Sheets

QUICK ARBITRATION AND SELECT (QAS) PROTOCOL IN SCSI INTERFACE FOR CONFIGURING A CURRENT TARGET DEVICE TO ASSERT A QAS MESSAGE CODE DURING A MESSAGE-IN PHASE

CROSS-REFERENCE TO RELATED APPLICATIONS

This Appln claims benefit of provisional application 60/049,726 Jun. 16, 1997. This application is related to co-pending application entitled Broadcast Command Packet Protocol For SCSI Interface, U.S. patent application Ser. No. 09/097,899, still pending, filed on instant date herewith and owned by the Assignee of the present invention, the disclosure of which is expressly incorporated herein by reference.

FIELD OF THE INVENTION

The present invention relates generally to electronic systems having an SCSI interface communicating in accordance with an SCSI communication protocol, and, in particular, to an SCSI protocol with reduced timing overheads for arbitration and (re)selection phases.

BACKGROUND OF THE INVENTION

The SCSI interface may be best described as a device independent input/output bus which allows a variety of peripheral devices to be connected to a personal computer system. SCSI refers to Small Computer Systems Interface and was initially developed to provide a disk drive interface that supported logical addressing of data rather than the more prevalent physical addressing. In addition, the SCSI interface was developed to transfer information in parallel, byte-wise fashion instead of serially, thus, ending certain compatibility difficulties associated with developing new disk drive technologies and bringing them to the market place. The electrical characteristics and signal protocols of the SCSI interface were developed in such a manner that the requirements of various peripheral devices could be accommodated with relative ease and flexibility. In particular, the SCSI interface protocol defines a number of commands which are available for accessing and querying a particular peripheral device regarding the parameter set required for the device to operate correctly. This particular feature of the SCSI interface makes it possible for a system designer to write a software device driver program for a generalized peripheral device, without regard to device specific parameter set details.

In accordance with the various versions of the SCSI interface, such as SCSI-1, SCSI-2, and SCSI-3, anywhere from 8 to 32 individual peripheral devices can be addressed on an SCSI bus depending on whether the bus is an 8-bit bus, a 16-bit bus or a 32-bit bus. These devices are generally categorized as initiators and targets, with any particular peripheral device able to play either role at any particular point in time. Specifically, a peripheral device functioning as an initiator is a device that initiates an information transaction or data transfer by giving another peripheral device a particular task to perform. An example of an initiator might well be the SCSI host adapter of a personal computer system, while an example of a typical target device might well be a rotating disk data storage system such as a hard disk drive or CD-ROM. A target peripheral device may thus be seen as the device which carries out the task identified by the initiator. As was mentioned previously, an SCSI interface bus configuration may have any combination of initiator and target devices, so long as the total does not exceed the number allowed by the bus width (8, 16, or 32).

However, regardless of the width of the SCSI bus, all data or information transfer transactions must take place in accord with the SCSI protocol, in which initiators must arbitrate for control of the SCSI bus before any message, command or data transaction is allowed to take place between an initiator and a target device. Conventionally, an arbitration winning initiator selects a particular target device to receive messages, commands and data in order to perform an information transfer transaction. If an initiator device requires several target devices to perform certain functions, that initiator must continue to re-arbitrate for control of the bus and sequentially address each of the target devices, in turn. For each target transaction, there is an arbitration, selection, a message phase, and a phase wherein the initiator transmits command and data information to the target, prior to the targets sending a message back to the initiator indicating receipt. This protocol activity takes place sequentially for each target device, with each transaction being completed, before the next is initiated.

Upon completion of each data transfer transaction, the SCSI bus is conventionally transition to a bus free condition, after which SCSI initiator devices arbitrate for control of the bus to initiate a next data transfer transaction. Alternatively, a target device, wishing to reconnect to the bus, may arbitrate for control, during which a connection (reconnection) is established between the target device and the original initiator.

Given the significant increases in SCSI information transmission speeds over the past few years, it will be understood that there is a significant penalty associated with transitioning to a bus free condition in order to allow a next arbitration and selection phase, for each data transfer transaction.

Accordingly, it will be seen that there is a significant need for some means to truncate the arbitration and selection portions of the conventional SCSI transaction protocol, particularly in those cases where a target device is giving up control of the bus and where further target devices have queued commands ready to execute. In those circumstances, an improved SCSI transaction protocol would allow a current target device to pass bus control directly to a subsequent target device without the need to affirmatively enter a bus free condition at the end of each process. Such an SCSI bus protocol would allow bus control to pass among a multiplicity of target devices without the intervention of an initiator, but still allow an initiator device to preempt the process and take control of the bus where conditions so warrant.

SUMMARY OF THE INVENTION

The present invention provides for a significant reduction of the overhead associated with the data transfer operation in a consequent increase in throughput efficiency, in accordance with the practice of the present invention, by reducing the percentage of SCSI bus time occupied by the protocol overhead to initiate and complete a command execution and data transfer operation. Arbitration and (re)selection overhead is significantly reduced in accordance with a novel protocol which allows a target to control transfer of bus ownership when the target device is ready to release the bus.

Rather than transitioning to a bus free phase at the end of a current process, the current target device issues a quick arbitrate and select broadcast message on the data bus which is recognizable by QAS protocol capable devices. A particular SCSI device is identified as capable of operating in accordance with the quick arbitrate and select protocol by entering device configuration information in each SCSI device's mode parameter pages. A particular SCSI bus system is placed into quick arbitrate and select protocol mode by invoking a mode select operation indicating the peripheral device parameter page.

In one aspect of the invention, the quick arbitrate and select protocols initiated during a message-in phase at the end of the current process. The quick arbitrate and select phase is invoked by adding a QAS (quick arbitration and select) message code to the list of SCSI message codes comprising the SCSI specification, and asserting the QAS code during the MSG phase. The quick arbitrate and select message is broadcast and all QAS capable devices "snoop" the bus during message-in phases in order to detect a QAS message. When the quick arbitrate and select message has been detected, all QAS capable devices requiring the bus place their SCSI IDs onto the data bus and wait for the current target device to deassert MSG. The current target device evaluates the quick arbitration SCSI IDs on the data bus, deasserts MSG, and drives the winning arbitration SCSI ID onto the data bus. The arbitrating devices examine the data bus to determine if their SCSI ID is asserted thereon. If so, SEL is asserted by the new bus owner along with its own SCSI ID and the SCSI ID it wishes to (re)connect).

In another aspect of the invention, a QAS capable initiator is able to preempt the QAS phase and take control of the SCSI bus. The QAS protocol comprises a fairness algorithm which grants control of the SCSI bus to a participating QAS target with the next lowest SCSI ID from that of the current QAS target. In accordance with the invention, an initiator preempts the QAS phase by asserting ATN along with its SCSI ID during the quick arbitration phase. In accordance with the protocol, an initiators assertion of ATN indicates that the initiator wishes to drive a message-out phase which, during a selection, message or status phase, calls for an immediate response by the current target. When an initiator asserts ATN during the quick arbitration phase, ATN is asserted as a broadcast command which requires all target devices to remove their SCSI IDs from the data bus, leaving only initiator IDs on the bus such that only initiators participate in the subsequent quick arbitration and selection.

BRIEF DESCRIPTON OF THE DRAWINGS

Features, aspects and advantages of the present invention will be more fully understood when considered with respect to the following detailed description and accompanying drawings, wherein.

DETAILED DESCRIPTION OF THE INVENTION

Prior to describing the quick arbitrate and select protocol in accordance with the present invention, it will be necessary to develop some understanding of the operation of the SCSI bus, as it would exist operating at FAST-80 data rates within the SCSI-3 protocol domain. While not yet established as a specific SCSI standard, the SCSI-3 protocol domain will be taken to be that set forth in the presently pending SCSI Parallel Interface (SPI) document X3T10/885D. In particular, transactions in accordance with the SCSI-3 protocol generally follow SCSI-2 practice and comprise several distinct bus phases; bus free, arbitration, (re)selection, command, data, message and status. As will be understood by those having skill in the art, the message phase may be further particularized into message in and message out phases, while the data phase will be recognized to refer to either data in or data out.

Of the bus phases referred to above, the arbitration phase, selection phase and reselection phase, deal exclusively with the bus protocol. In accordance with convention, the arbitration phase defines that period during which one or more SCSI initiators (or SCSI targets wishing to reconnect to the bus) compete in order to determine which device will gain control of the SCSI bus.

Figure 1:
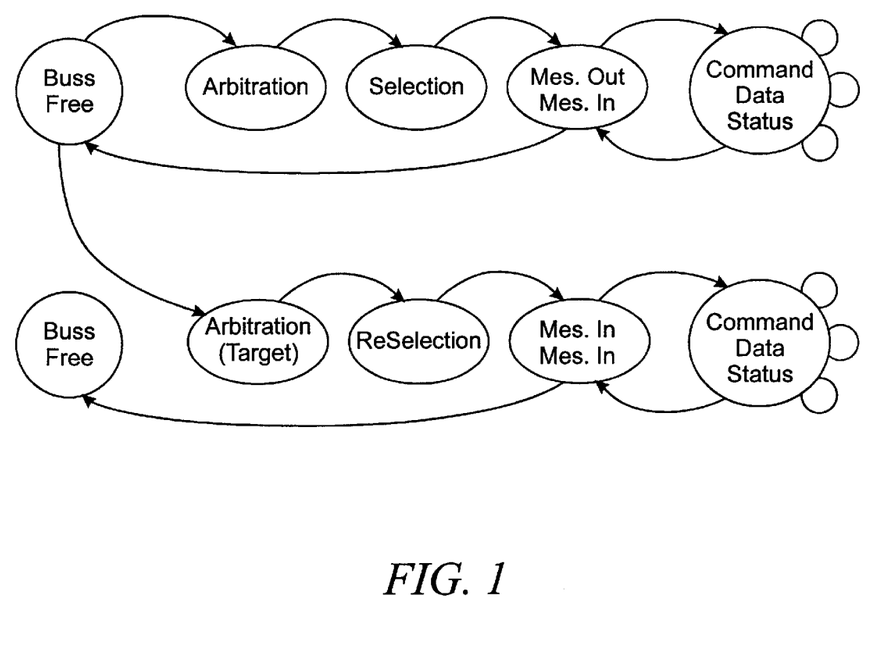
FIG. 1 is a simplified phase diagram of the conventional SCSI-3 protocol.
Figure 2:
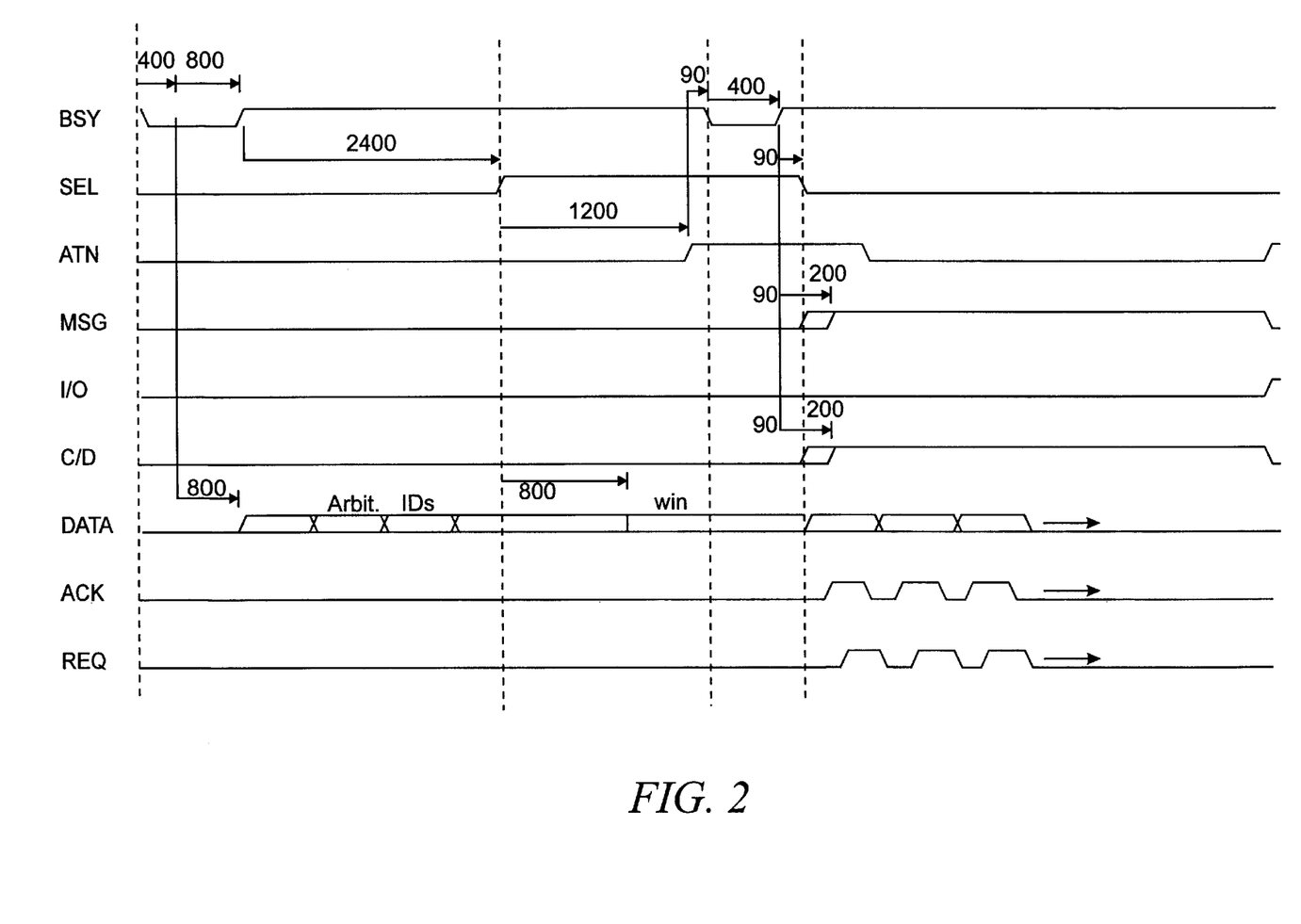
FIG. 2 is a simplified timing diagram of the conventional SCSI-3 protocol.

The conventional portion of the SCSI-3 protocol can be best understood with reference to FIGS. 1 and 2 which depict a simplified phase diagram and simplified timing diagram, respectively, of the conventional SCSI-3 protocol. Although several variations to the SCSI specification are in use, the timings and phase flows are given in accordance with the SCSI specification as defined by ANSI X3.131-1994 (the so-called SCSI-2 specification). According to this SCSI specification, if a particular initiator (or alternatively a target) wishes to arbitrate for use of the bus, the device asserts BSY, while at the same time asserting the data bit (DB0–DB7) that corresponds to its SCSI ID. This establishes the arbitration phase from the bus free phase. Each initiator (or target) which is actively arbitrating for use of the bus, examines the data bus portion to determine whether a higher priority SCSI ID is being asserted in competition for use of the bus. In accordance with the SCSI protocol, the arbitration winner is defined as the device with the highest SCSI ID value (i.e., ID-07 has the highest priority, ID-00 has the lowest). If for example, initiator ID-07 was arbitrating for the bus, it would necessarily win arbitration.

Once a particular initiator (or a target device wishing to reconnect to the bus) wins arbitration, the protocol proceeds to the selection phase (a reselection phase is established in the case of a target device winning arbitration) during which a connection is established between the initiator and the desired target device. The winning initiator (or target) asserts SEL, thus indicating to all other competing devices that arbitration is concluded and they should release BSY and deassert their SCSI IDs from the data bus. Following a bus clear delay, the winning initiator next asserts the data bus with the corresponding ID bit of the desired target, and asserts ATN indicating that a message out phase will follow. Following an approximately 90 ns deskew delay, after ATN assertion, the initiator releases BSY. At this point (BSY released), all of the devices coupled to the bus examine the data bus to determine whether their SCSI ID bit is asserted thereon. If a device identifies its SCSI ID bit on the data bus, it evaluates the data bus to determine the identity of the initiator (the second set data bit on the bus) and asserts BSY in order to take control of the SCSI bus.

No more than approximately 90 ns of deskew delay following the assertion of BSY by a target device, the initiator releases SEL and proceeds to the next phase of the protocol, a message out bus phase. The message phase is commonly used by initiator and/or target devices to transfer message bytes containing information concerning bus operational parameters and handshake protocol. With regard to the polarity of the message phase, in and out are conventionally interpreted with respect to the initiator device (i.e., message out refers to a message being sent by the initiator to the target). In this regard, I/O is asserted high by a target if the message phase is to be a message in, and I/O is deasserted (held low) if the message phase is a message out.

If a target is intended to receive a message from an initiator device during a message out phase, the initiator device asserts ATN, which requires the immediate transfer of the message byte on the data bus. So long as ATN is asserted, the message transfer proceeds in accordance with the conventional SCSI REQ/ACK sequence. A target device asserts REQ in response to which the initiator transfers a message byte onto the data bus and asserts ACK. The target device reads the byte and releases REQ, following which the initiator releases ACK to complete the transfer. ATN is released by the initiator when all of the bytes comprising the message have been transferred to the target. The target ends the message phase by releasing MSG. The target device is able to determine when to release MSG because the number of bits comprising the entire message is included in the first message byte.

Following transmission of the message bytes, the initiator releases ATN, and the target device enters the next phase of the protocol, the command phase, in order to receive the SCSI command descriptor blocks (CDBs) from the initiator. The command phase is characterized by the C/D line being asserted while I/O and MSG are deasserted (inactive).

SCSI commands are provided to the data bus by the initiator as a sequence of bytes, commonly referred to as command descriptor block. As will be understood by those having skill in the art, descriptor blocks may be 6, 10, 12, or 16 bytes in length, and are sequentially read by the target device in accordance with the REQ/ACK sequence described above. In accordance with accepted convention, the first byte of every command descriptor block is termed the OP code and includes a command group which corresponds to a descriptor block of particular length, By examining the first byte of a command descriptor block a target device is able to determine which command to execute and how many bytes remain in the descriptor block to be received. After the target receives in queues all the command bytes from the initiator, the target releases C/D, thus ending the command phase.

Following the command phase, a data phase controls information and user data exchange between the target device and the initiator. A target device begins a data phase by deasserting C/D and MSG, at which time asynchronous or synchronous data transfers may take place between the two devices. If data is desired to be transferred from the target to the initiator, the target asserts I/O thereby indicating that the data phase is a data in phase (data to the initiator). Conversely, if data is desired to be transferred from the initiator to the target device (i.e., the target wishes to receive data), the target deasserts I/O indicating that the data phase is a data out phase (data out of the initiator). Data bytes are transferred to or from the target device in accordance with the REQ/ACK sequences described in connection with the message and command phases above.

Finally, a target device enters the status phase in order to transmit a status byte (such as good, busy, intermediate, condition met, and the like) to the initiator. The status byte is transferred in a single REQ/ACK sequence and is followed by a message in phase which informs the initiator that a particular command is finished executing. If no further commands or I/O processes are contained within the target devices command queue, the target device releases the bus which subsequently enters the bus free condition.

It will be understood by one having skill in the art that the SCSI protocol may be generally viewed as operating in two stages. The first stage is characterized by an arbitration phase followed by a selection phase, a message out phase, and a command phase, following which the target device either places the bus in the data phase and begins transferring data or, as indicated in FIG. 1, places the bus in a message in phase and issues a SAVE POINTERS/DISCONNECT message back to the initiator, indicating that the target wishes to interrupt the I/O process in order to free the bus for other devices. Such a condition may typically obtain when a target device must access data from a physical media, such as a rotating magnetic disk data storage system (a hard drive). Since hard drive data access times are typically on the order of from about 5 to about 10 ms, target devices frequently release the bus for other uses while performing data access operations. Accordingly, whether issuing a DISCONNECT or COMMAND COMPLETE, the target device transitions through a message in phase and releases the bus to a bus free phase, in accordance with conventional protocol.

Further, in accordance with the conventional SCSI protocol, any subsequent activity on the bus is subject to a conventional arbitration and (re)selection phases.

Significant overhead exists in the arbitration/(re)selection phases of the conventional protocol. In accordance with the SCSI specification, the conventional protocol comprises an arbitration overhead of approximately 3 us which comprises a bus settle delay of about 400 ns during which BSY remains false in order to validate the bus free condition. Arbitration overhead also includes a bus free delay of about 800 ns the bus free condition is validated prior to the assertion of BSY and the assertion of an arbitration ID bit by competing initiators. Following BSY assertion, arbitration overhead includes an arbitration delay of approximately 2400 ns during which time competing initiators examine the arbitration IDs on the data bus to determine the arbitration winner. Following the arbitration delay, SEL is asserted by the arbitration winner to begin the selection phase.

Selection overhead is approximately 1.78 us (rounded up to 2.0 us for ease of subsequent calculations) and comprises a first bus clear delay during which time all other competing devices release BSY and remove their ID bit from the data bus. The selection overhead further includes a bus settle delay of about 400 ns during which time the initiator asserts the data signal corresponding to the ID of the desired target prior to asserting ATN. Next, selection overhead includes 2 deskew delays which represent the time necessary to deskew the assertion of ATN and the release of BSY by the initiator. An additional 400 ns bus settle delay represents the minimum time which a target device (for example) must wait following the release of BSY before it reasserts BSY. Finally, two additional deskew delays are required between the target reassertion of BSY and when the initiator release SEL.

Accordingly, the total timing overhead for arbitration and (re)selection phases will be understood to be in the of from about 4.38 to about 4.6 us. In the context of a data transfer within the SCSI-3 protocol domain, when a 10 byte CDB is used for issuing a 4K SCSI read to an SCSI device and the data is returned using two reconnections, each with a 2K transfer, a 5.6 us arbitration (re)selection overhead represents a significant fraction of the total 32.5 us overhead comprising such a transaction.

A significant reduction of the overhead associated with a data transfer operation (for example) and a consequent increase in throughput efficiency can be achieved, in accordance with practice of the present invention, by reducing the percentage of SCSI bus time occupied by the protocol overhead to initiate and complete a command execution and data transfer. In accordance with practice of the invention, arbitration and (re)selection overhead is reduced by a novel protocol which allows a target control transfer of bus ownership when the target device is ready to release the bus, whereby the target ready to give up the bus controls who is to gain control of the bus next. Briefly, after the current target device issues SAVE POINTERS and/or DISCONNECT, or COMMAND COMPLETE messages, instead of transitioning to the bus free condition, the current target issues a QUICK ARBITRATE AND SELECT (QAS/ 0x55) broadcast message on the data bus which is recognizable by QAS protocol capable devices.

Determining whether a particular SCSI device is capable of operating in accordance with the quick arbitrate and select protocol may be accomplished during boot and/or interrogation proceedings by entering device configuration information in a particular SCSI device's mode parameter pages. In particular, parameter page code 00h is conventionally designated as a vendor specific page and may provide a suitable location for entering a quick arbitrate and select protocol capable bit. To place a particular SCSI bus system into quick arbitrate and select protocol mode would then involve a conventional mode SELECT operation indicating the peripheral device parameter page.

Figure 3:
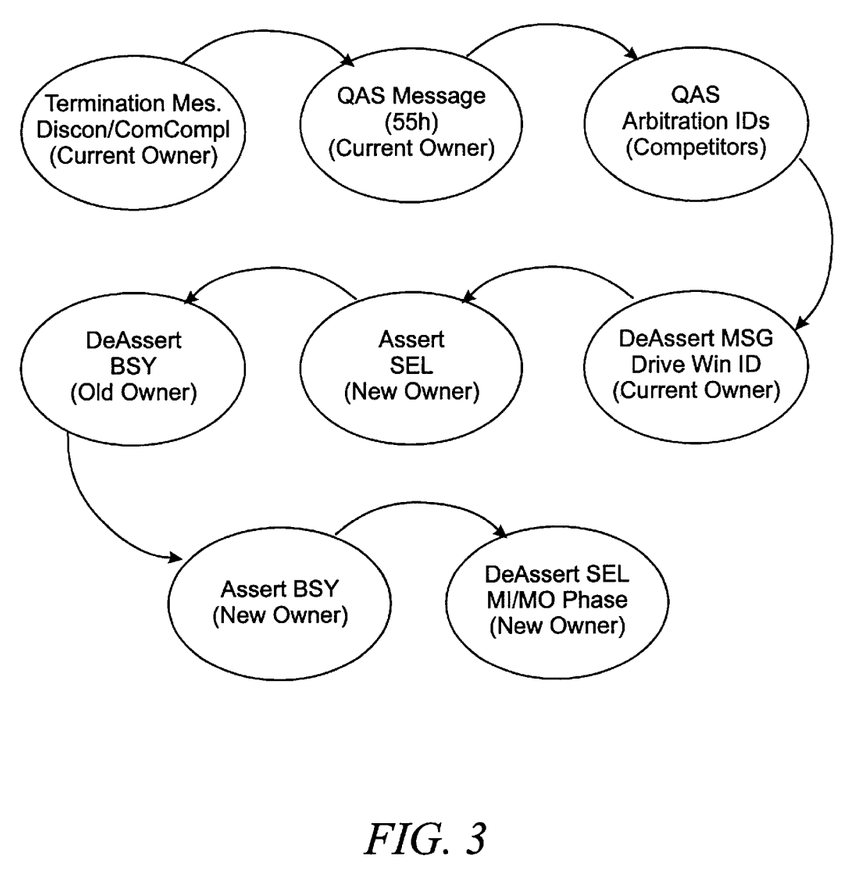
FIG. 3 is a simplified phase diagram of an SCSI protocol including a quick arbitrate and select phase in accordance with the present invention.
Figure 4:
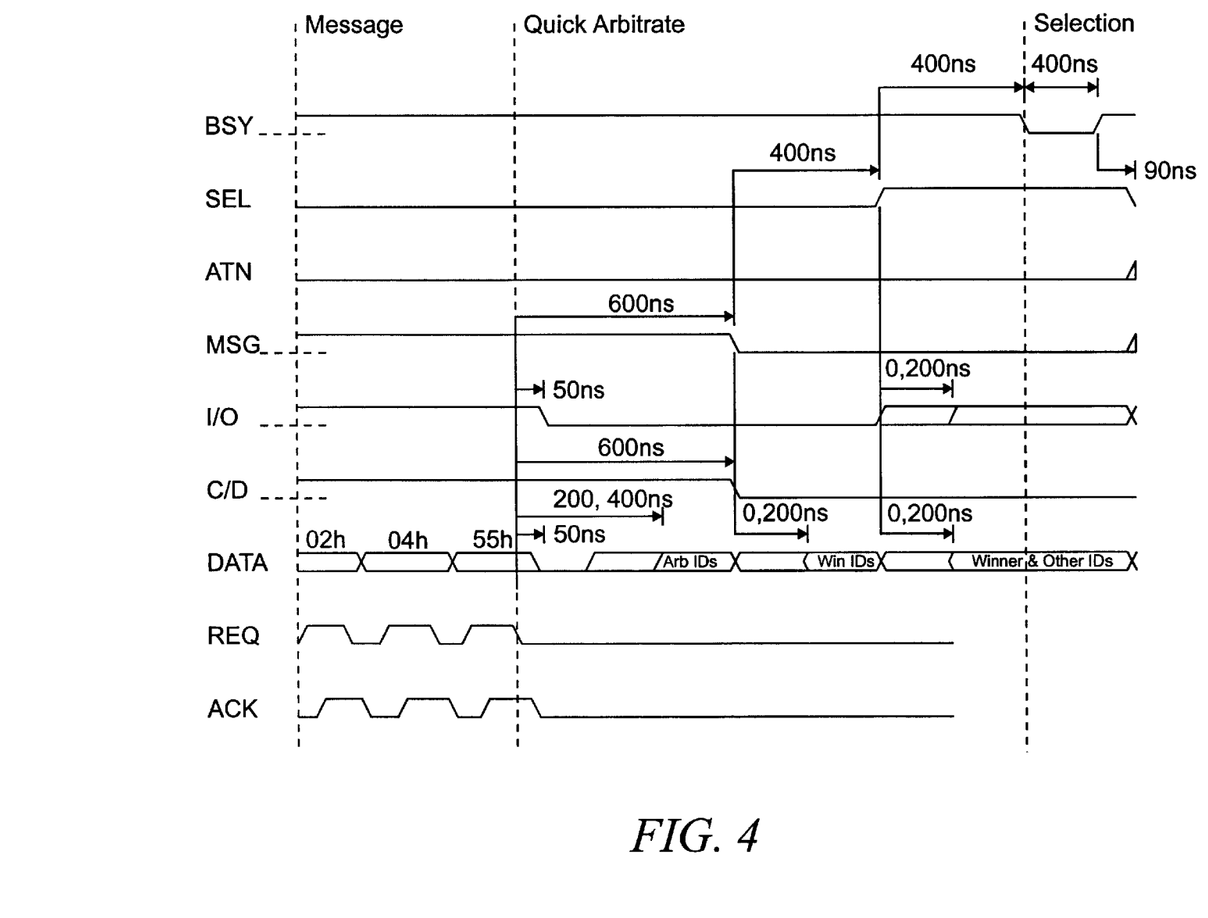
FIG. 4 is a simplified timing diagram of an SCSI protocol including a quick arbitrate and select phase in accordance with the present invention.

Specifically, the quick arbitrate and select protocol is initiated during a message in phase as depicted in the exemplary phase diagram of FIG. 3 and the exemplary timing diagram of FIG. 4 which illustrate the bus phases and protocol timings comprising an SCSI transaction in accordance with the invention. Initially, a QUICK ARBITRATE AND SELECT message code is added to the list of SCSI message codes comprising the SCSI specification. Preferably the QAS message will be identified by code 55h, but since the conventional message codes between 23h and 80h are presently undefined, any value in that range may be used. It will be understood that message code 55h has been arbitrarily chosen and its specific value has little relevance to the scope and spirit of the invention.

As can be seen in FIG. 4, QAS code 55h is asserted by the current QAS target at the end of the message in phase. At this point, it will be useful to note that MSG is asserted in accordance with conventional message phase protocol requirements. The quick arbitrate and select message is broadcast, thus requiring that all QAS capable devices "snoop" the bus during message in phases in order to detect a QAS message. As the current target drops REQ, the protocol enters and begins a quick arbitration phase. When the quick arbitrate and select message has been detected, all QAS capable devices requiring the bus place their SCSI IDs onto the data bus and wait for the current target device to deassert MSG. Approximately 50 ns following the deassertion of REQ (a typical deskew delay) the current device deasserts QAS (55h) and begins evaluating the quick arbitration SCSI IDs on the data bus (allowing 400 ns bus settle delay in order that all bus signals settle to their new values). 600 ns after deasserting REQ (after sending the QAS message) the current target device deasserts MSG and drives the winning arbitration SCSI ID onto the data bus. When MSG is detected deasserted by the arbitrating devices, they remove their SCSI IDs from the bus while the current device (the bus owner) holds the winning SCSI ID on the bus. Following a 200 ns delay, the arbitrating devices examine the data bus to determine if their SCSI ID is asserted thereon. If so, SEL is asserted by the new bus owner along with its own SCSI ID and the SCSI ID it wishes to (re)connect. Accordingly, it will be seen that the timing overhead between the deassertion of MSG by the current bus owner and the assertion of SEL by the new bus owner is no more than the conventional required 400 ns bus settle delay. Moreover, the total timing overhead associated with the quick arbitration phase of the protocol according to the invention, will be seen to be on the order of 1.0 us in contrast to the 3.6 us timing overhead of the conventional arbitration phase of the conventional SCSI protocol.

400 ns (a bus settle delay) after SEL is detected asserted, the former bus owner deasserts BSY and the protocol progresses to a conventional selection phase. Following a 400 ns bus settle delay, the selected new bus owner asserts BSY and, within 2 deskew delays (approximately 90 ns) deasserts SEL in order to enter a conventional message in or message out phase.

It can be seen that summing the timing overheads associated with the quick select phase of the protocol in accordance with the invention results in a quick selection timing overhead of approximately 890 ns (rounded up to 0.9 us for ease of further calculation) as opposed to the conventional selection overhead of 2.0 us in accordance with the conventional SCSI protocol. Thus, in accordance with practice of the present invention, it will be seen that the quick arbitrate and select protocol will comprise a total timing overhead of approximately 1.9 us in contrast to the approximately 5.6 us timing overhead of the conventional SCSI protocol.

The quick arbitrate and select protocol in accordance with the present invention includes additional advantageous features relating to the cases where a QAS message is broadcast on the bus with no takers and where a QAS capable initiator wishes to preempt QAS and take control of the bus. Additionally the QAS protocol in accordance includes a fairness algorithm which grants control of the bus to a participating QAS target with the next lowest SCSI ID from that of the current QAS target. In particular, if the current QAS target is SCSI ID 04 and is initiating quick arbitration for control of the bus, an SCSI IDs 1, 2, 5 and 7 are competing for quick arbitration, the current QAS target will grant control of the bus to SCSI ID 02.

Figure 5:
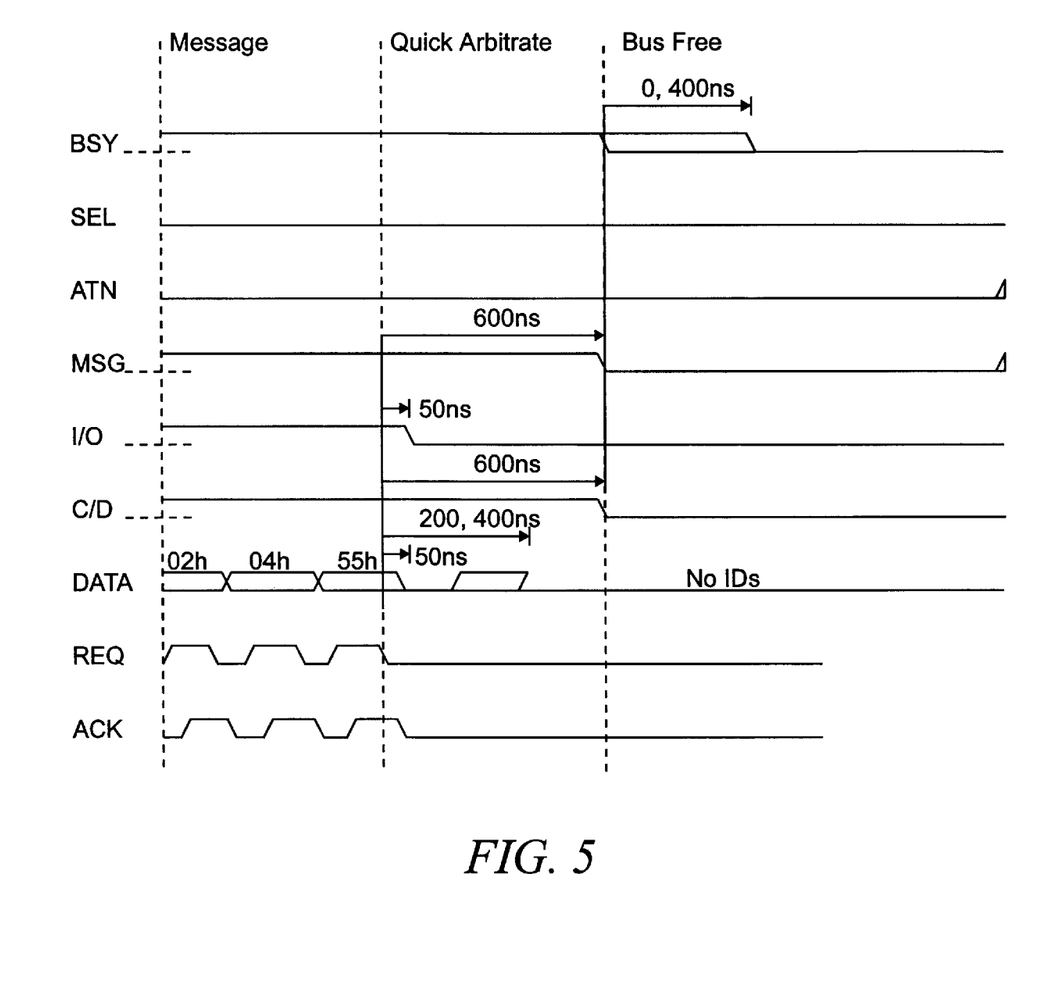
FIG. 5 is a simplified timing diagram of a quick arbitrate and select phase in accordance with the present invention, depicting the case where no QAS capable devices wish to arbitrate for the bus.

Turning now to FIG. 5, there is depicted an exemplary simplified timing diagram of the quick arbitrate and select protocol in accordance with the invention for the case in which no QAS capable devices are ready for the bus following assertion of QAS message 55h by the current target. As shown in the Figure, the first portion of the quick arbitration phase is similar to that depicted in FIG. 4. Specifically, the current target asserts 55h on the data bus following a DISCONNECT message, indicating the beginning of a quick arbitration and select phase. As before, the current target drops I/O and removes the quick arbitrate and select message from the data bus approximately 50 ns following the trailing edge of REQ. Accordingly, the data bus is now ready to receive SCSI IDs from competing QAS capable devices which wish to arbitrate for the bus. Approximately 200 ns after dropping REQ, the current target begins examining the data bus for the potential arbitration IDs. After an additional 200 ns delay (for a total 400 ns bus settle delay) the current QAS target determines that the data bus is empty indicating that there are no takers for the current quick arbitration and selection phase. 200 ns after the current QAS target determines that no one is competing for quick arbitration, it drops MSG and C/D indicating the determination of the quick arbitration phase. At this time, the current QAS target also deasserts BSY, thus transitioning the bus into a bus free phase. It should be noted that although BSY is deasserted by the current bus owner at the same time as it deasserts MSG and C/D, the deassertion of BSY in FIG. 5 is indicated as taking place within a 400 ns window because of the bus settle delay requirement (400 ns) of the SCSI specification. The beginning of the bus free phase, however, is conventionally taken to be the point at which the current bus owner deasserts BSY and the 400 ns bus settle delay is conventionally defined as comprising a portion of the bus free overhead. Accordingly, even in the case where there are no takers for a particular quick arbitration phase, the overhead associated with quick arbitration (no takers) phase is no more than 600 ns. Since the conventional protocol requires a 400 ns window period for a current bus owner to transition the bus to a bus free condition following a COMMAND COMPLETE and/or DISCONNECT, it will be understood that appending a quick arbitration phase onto the end of a message in phase adds no more than 200 ns to a total transaction. However, since the normal case is where several devices will wish to compete for control of the data bus following a current command or I/O process, appending a quick arbitration phase to the end of a message in phase would more commonly result in a significant reduction in the total overhead time associated with multiple transactions. The foregoing description and the timing diagram of FIG. 5 are provided only to illustrate how the quick arbitrate and select protocol of the present invention would handle the relatively rare case where no QAS capable devices wish to arbitrate for use of the data bus.

An additional advantageous feature of the present invention is that it provides mechanism for SCSI initiator devices to preempt the quick arbitration and selection phase. In accordance with well understood convention, SCSI initiators typically have SCSI IDs holding a higher priority than the SCSI IDs of target devices. Since target devices, utilizing the QAS protocol, grant control of the bus to competing QAS targets with the next lowest SCSI ID from that of the current target, in accordance with the fairness algorithm described above, if an initiator device were to participate in quick arbitration it would necessarily loose. SCSI initiators therefore require some means to gain control of the bus aside from participation in quick arbitration in accordance with the invention.

Figure 6:
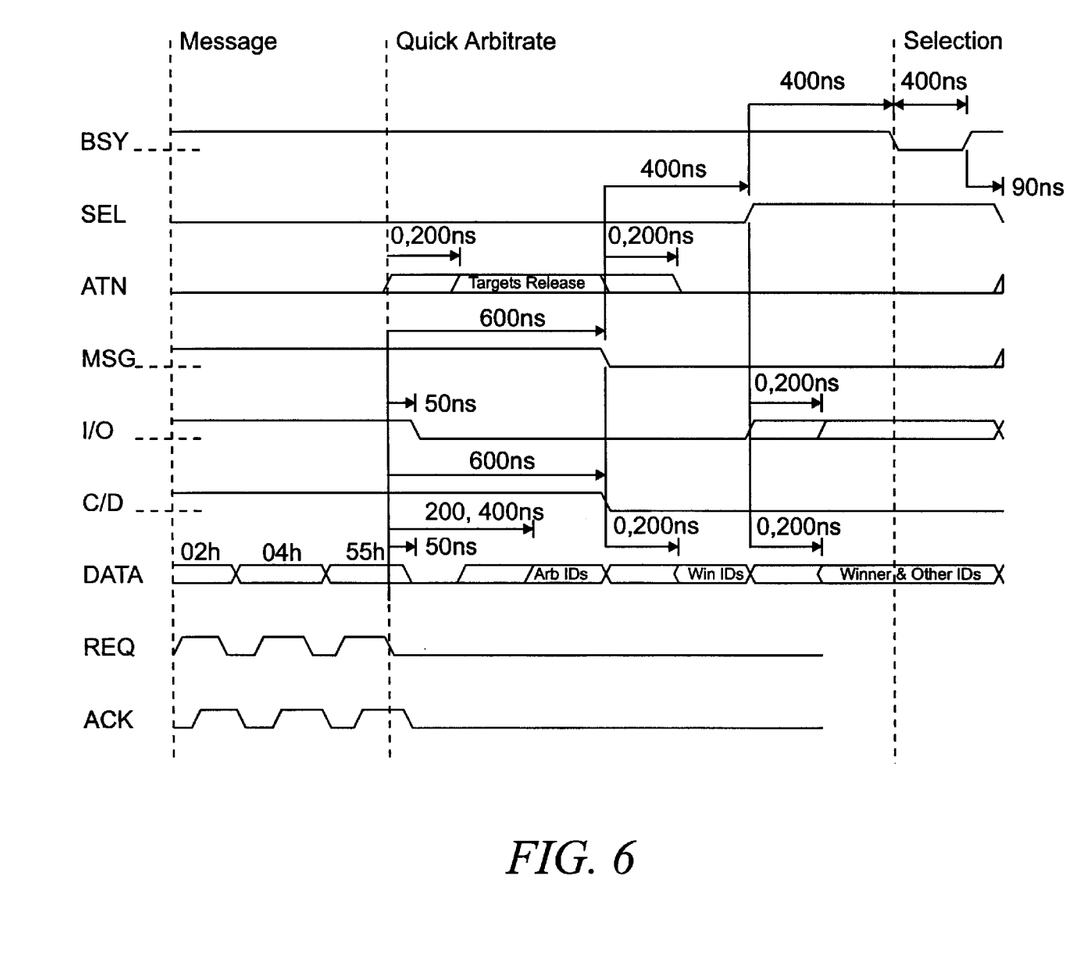
FIG. 6 is a simplified timing diagram of a quick arbitrate and select phase in accordance with the present invention, including a quick arbitrate and select initiator preemption protocol.

Turning now to FIG. 6, there is shown an exemplary simplified timing diagram of an initiator preemption mechanism as incorporated in the quick arbitrate and select protocol. As in the previous cases of FIGS. 4 and 5, the current QAS target asserts a QAS message (55h) on the data bus following a DISCONNECT message (04h) and asserts an REQ pulse, the end of which defines the beginning of the quick arbitration phase. 50 ns following the end of REQ, the current QAS target drops both data and I/O and waits for QAS capable devices to indicate their desire to arbitrate for the bus by placing their SCSI IDs thereon. An initiator may preempt the QAS phase by asserting ATN along with its SCSI ID during the quick arbitration phase. In accordance with the conventional SCSI-3 protocol, an initiator is permitted to assert ATN during any phase except the bus free phase or conventional arbitration phase. In accordance with conventional protocol, an initiator's assertion of ATN indicates that an initiator wishes to drive a message out phase which (during a selection, message or status phase) calls for an immediate response by the current target.

In accordance with the quick arbitration and select protocol of the present invention, when an initiator asserts ATN during the quick arbitration phase, ATN is asserted as a broadcast command which requires all target devices to remove their SCSI IDs from the data bus, leaving only initiator IDs on the bus such that only initiators participate in the subsequent quick arbitration and selection.

As can be seen in FIG. 6, after an initiator asserts ATN, target devices release their SCSI IDs from the bus leaving only initiator IDs approximately 400 ns following the assertion of ATN. 600 ns following the assertion of ATN, MSG, and C/D are deasserted and the current bus owner drives the winning arbitration SCSI ID onto the data bus. When MSG is detected deasserted by the arbitrating initiator devices, they remove their SCSI IDs from the bus while the current bus owner holds the winning SCSI ID on the bus. After removing their IDs (and waiting 200 ns), the arbitrating initiator devices check to see if their ID is still asserted on the bus. If so, SEL is asserted by the new bus owner along with its own ID and the ID of a target device to which it wishes to select. As described previously, 400 ns (a bus settle delay) after SEL is detected asserted, the previous bus owner deasserts BSY. The bus then enters a selection phase in accordance with conventional protocol. In other words, following deassertion of BSY by the previous bus owner (selection phase), the protocol of the present invention operates in a manner similar to the conventionally defined SCSI protocol.

The need for initiator preemption, and indeed the need for a quick arbitration and selection protocol, can be best understood with reference to a novel broadcast command packet protocol described in co-pending application entitled Broadcast Command Packet Protocol For SCSI Interface, filed on instant date herewith and owned by the Assignee of the present invention, the entire disclosure of which is expressly incorporated herein by reference. According to the broadcast command packet protocol, a multiplicity of command packets are broadcast in sequential bursts by a particular initiator device and are directed to a multiplicity of target devices subsequent to a single initiator arbitration. When a multiplicity of target devices contain commands in their command queues subsequent to a single arbitration, it is easy to understand the necessity for a method and system for quickly transferring ownership of the bus upon a first target's assertion of COMMAND COMPLETE and/or DISCONNECT. In other words, a single initiator may burst 5, 6, 7 or more command packets to 3, 4 or more different target devices or processes, and then shift off-line, thus allowing the multiplicity of targets to execute their commands or processes in accordance with a quick arbitration and selection protocol set up amongst themselves.

Once the overall system implementation is understood, the utility of the fairness algorithm becomes apparent. Once an initiator devices bursts a multiplicity of command packets to a multiplicity of targets, some means must exist to assure that target groupings access to the bus in order to execute their commands or I/O processes, without undue intervention by other devices. In accordance with the broadcast command packet protocol, the target device which receives the first broadcast command packet is granted control of the bus after all of the packets have been delivered. Once the first target device completes its command, the fairness algorithm allows it to grant control to the bus to a next target device, presumably a target device which also received a command packet during the packet protocol phase. A target grouping which received command packets may thereby short-cut the conventional protocol and retain control of the bus amongst themselves until such time as all of the command packets have been executed and the last quick arbitration phase results in no takers. This private session is interruptible by an initiator by use of the QAS preemption in the event an initiator must gain control of the bus for whatever reason. Needless to say, once an initiator accesses the target, and that target completes its command or data transfer operation, the target enters the QAS phase eventually returning control the to private session of the previously defined target grouping.

EFFICIENCY ANALYSIS

The following analysis is a comparison between 4K data read operations according to the existing SCSI FAST-80 protocol and a combination of the quick arbitrate and select protocol and broadcast command packet protocol, in accordance with the invention, implementing multiple broadcast command packets. The analysis evaluates SCSI bus efficiency when the 4K read operation is performed over a narrow and a wide bus, and with 2K and 4K data chunks.

The following Tables 1 and 2 evaluate SCSI bus efficiency as it would exist operating at FAST-80 data rates within the conventional SCSI-3 protocol domain. In Table 1, efficiency for both narrow (80 MB/s) and wide (160 MB/s) data rates are calculated when a 10 byte CDB is used for issuing a 4K SCSI read to an SCSI disk. The data is returned using 2 reconnections each with a 2K transfer.

TABLE 1

Ultra-3/SCSI Timing/4K Read/2K Data Chunks

| Narrow SCSI 80 MB/s | | Wide SCSI 160 MB/s | |
|---|---|---|---|
| Arbitration | 3.6 | Arbitration | 3.6 |
| Selection | 2 | Selection | 2 |
| Identify/Simple Tag MO | 1.5 | Identify/Simple Tag MO | 1.5 |
| OutOut Phase Change | 0.4 | OutOut Phase Change | 0.4 |
| Command | 5 | Command | 5 |
| OutIn Phase Change | 0.8 | OutIn Phase Change | 0.8 |
| SavePtrs/Disconnect | 1 | SavePtrs/Disconnect | 1 |
| Arbitration | 3.6 | Arbitration | 3.6 |
| ReSelection | 2 | ReSelection | 2 |
| Identify/Simple Tag MI | 1.5 | Identify/Simple Tag MI | 1.5 |
| InIn Phase Change | 0.4 | InIn Phase Change | 0.4 |
| Transfer Narrow 2K | 25.6 | Transfer Wide 2K | 12.8 |
| InIn Phase Change | 0.4 | InIn Phase Change | 0.4 |
| SavePtrs/Disconnect | 1 | SavePtrs/Disconnect | 1 |
| Arbitration | 3.6 | Arbitration | 3.6 |
| ReSelection | 2 | ReSelection | 2 |
| Identify/Simple Tag MI | 1.5 | Identify Simple Tag MI | 1.5 |
| InIn Phase Change | 0.4 | InIn Phase Change | 0.4 |
| Transfer Narrow 2K | 25.6 | Transfer Wide 2K | 12.8 |
| InIn Phase Change | 0.4 | InIn Phase Change | 0.4 |
| Status | 0.5 | Status | 0.5 |
| InIn Phase Change | 0.4 | InIn Phase Change | 0.04 |
| Complete MI | 0.5 | Complete MI | 0.5 |
| Overhead (us) | 32.5 | Overhead (us) | 32.5 |
| Data Transfer (us) | 51.2 | Data Transfer (us) | 25.6 |
| Total Bus Time (us) | 83.7 | Total Bus Time (us) | 58.1 |
| Efficiency (%) | 61.2 | Efficiency (%) | 44.1 |
| Average TP (MB/s) | 49 | Average TP (MB/s) | 70.6 |

Table 2 describes SCSI bus efficiency when a 10 byte CDB is used for issuing a 4K SCSI read to an SCSI disk. The data is returned in a single reconnection, with a 4K transfer.

TABLE 2

Ultra-3/SCSI-3 Timing/4K Read/4K Data Chunks

| Narrow SCSI 80MB/s | | Wide SCSI 160 MB/s | |
|---|---|---|---|
| Arbitration | 3.6 | Arbitration | 3.6 |
| Selection | 2 | Selection | 2 |
| Identify/Simple Tag MO | 1.5 | Identify/Simple Tag MO | 1.5 |
| OutOut Phase Change | 0.4 | OutOut Phase Change | 0.4 |
| Command | 5 | Command | 5 |
| OutIn Phase Change | 0.8 | OutIn Phase Change | 0.8 |
| SavePtrs/Disconnect | 1 | SavePtrs/Disconnect | 1 |
| Arbitration | 3.6 | Arbitration | 3.6 |
| ReSelection | 2 | ReSelection | 2 |
| Identify/Simple Tag MI | 1.5 | Identify Simple Tag MI | 1.5 |
| InIn Phase Change | 0.4 | InIn Phase Change | 0.4 |
| Transfer Narrow 4K | 51.2 | Transfer Wide 4K | 25.6 |
| InIn Phase Change | 0.4 | InIn Phase Change | 0.4 |
| Status | 0.5 | Status | 0.5 |
| InIn Phase Change | 0.4 | InIn Phase Change | 0.4 |
| Complete MI | 0.5 | Complete MI | 0.5 |
| Overhead (us) | 22.8 | Overhead (us) | 22.8 |
| Data Transfer (us) | 51.2 | Data Transfer (us) | 25.6 |
| Total Bus Time (us) | 74 | Total Bus Time (us) | 48.4 |
| Efficiency (%) | 69.2 | Efficiency (%) | 52.9 |
| Average TP (MB/s) | 55.4 | Average TP (MB/s) | 84.6 |

As can be seen from evaluating Tables 1 and 2, operational overhead remains the same for both narrow and wide data rates. As would be expected, returning data in a single reconnection with a 4K transfer, exhibits higher average throughput (better efficiency) than returning data using two reconnections. However, in the case of a wide (160 MB/s) transfer, bus efficiency less than 50% when two reconnections are required, and only slightly exceeds 50% when data is returned in a single reconnection, with a 4K transfer.

The following Tables 3 and 4 evaluate SCSI bus efficiency as it would exist operating at FAST-80 data rates within both the broadcast command protocol domain and the quick arbitrate and select protocol domain in accordance with the present invention. Tables 3 and 4 evaluate the bus efficiencies and average throughput values in an exemplary case where 16 commands are burst to a mix of target devices using the broadcast command packet protocol and the quick arbitrate and select protocol for a 4K SCSI read to an SCSI disk. Tables 3 and 4 evaluate bus efficiencies for multiple 4K SCSI reads with 2K and 4K data chunk transfers respectively.

TABLE 3

Ultra-3/QAS/16 BCPs/4K Read/2K Data Chunks

| Narrow SCSI 80MB/s | | | Wide SCSI 160 MB/s | |
|---|---|---|---|---|
| QA | 1 | | QA | 1 |
| QS | 0.9 | | QS | 0.9 |
| BCPs(16) | 19 | | BCPs(16) | 19 |
| OutIn Phase Change | 0.8 | | OutIn Phase Change | 0.8 |
| QA | 1 | x31 | QA | 1 |
| QS | 0.9 | x31 | QS | 0.9 |
| Identify/Simple Tag MI | 1.5 | x31 | Identify/Simple Tag MI | 1.5 |
| InIn Phase Change | 0.4 | x31 | InIn Phase Change | 0.4 |
| Transfer Narrow 2K | 25.6 | x32 | Transfer Wide 2K | 12.8 |
| InIn Phase Change | 0.4 | x32 | InIn Phase Change | 0.4 |
| SavePtrs/Dis/QAS | 1.5 | x16 | SavePtrs/Dis/QAS | 1.5 |
| Status | 0.5 | x16 | Status | 0.5 |
| InIn Phase Change | 0.4 | x16 | InIn Phase Change | 0.4 |
| Complete/QAS MI | 1 | x16 | Complete/QAS MI | 1 |

TABLE 3-continued

Ultra-3/QAS/16 BCPs/4K Read/2K Data Chunks

| Narrow SCSI 80MB/s | | Wide SCSI 160 MB/s | |
|---|---|---|---|
| Overhead (us) | 200.7 | Overhead (us) | 200.7 |
| Data Transfer (us) | 819.2 | Data Transfer (us) | 409.6 |
| Total Bus Time (us) | 1019.5 | Total Bus Time (us) | 609.9 |
| Efficiency (%) | 80.4 | Efficiency (%) | 67.2 |
| Average TP (MB/s) | 64.3 | Average TP (MB/s) | 107.5 |

TABLE 4

Ultra-3/16 BCPs/4K Read/4K Data Chunks

| Narrow SCSI 80MB/s | | | Wide SCSI 160 MB/s | |
|---|---|---|---|---|
| QA | 1 | | QA | 1 |
| QS | 0.9 | | QS | 0.9 |
| BCPs (16) | 19 | | BCPs (16) | 19 |
| OutIn Phase Change | 0.8 | | OutIn Phase Change | 0.8 |
| QA | 1 | x15 | QA | 1 |
| QS | 0.9 | x15 | QS | 0.9 |
| Identify/Simple Tag MI | 1.5 | x15 | Identify/Simple Tag MI | 1.5 |
| InIn Phase Change | 0.4 | x15 | InIn Phase Change | 0.4 |
| Transfer Narrow 4K | 51.2 | x16 | Transfer Wide 4K | 25.6 |
| InIn Phase Change | 0.4 | x16 | InIn Phase Change | 0.4 |
| Status | 0.5 | x16 | Status | 0.5 |
| InIn Phase Change | 0.4 | x16 | InIn Phase Change | 0.4 |
| Complete/QAS MI | 1 | x16 | Complete/QAS MI | 1 |
| Overhead (us) | 115.5 | | Overhead (us) | 115.5 |
| Data Transfer (us) | 819.2 | | Data Transfer (us) | 409.6 |
| Total Bus Time (us) | 931.2 | | Total Bus Time (us) | 521.9 |
| Efficiency (%) | 87.9 | | Efficiency (%) | 78.5 |
| Average TP (MB/s) | 70.3 | | Average TP (MB/s) | 125.6 |

As can be seen by comparing the bus efficiencies and average throughput values for the transers in accordance with the invention of Tables 3 and 4 with the existing protocol transfers of Tables 1 and 2, the protocols, in accordance with the invention, provide significant improvements in efficiency and average throughput by significantly reducing the amount of overhead required for transfers. In particular, it should be noted that bus efficiency is greater than 65% for every case and approaches 88% in the case of 4K read over a narrow bus using the 4K data chunks. Indeed, the average throughput for a wide transfer of 4K data chunks now exceeds 125 MB/s.

It will be apparent to those skilled in the art that the present brings to the field of SCSI protocols a novel technique for reducing the timing overhead associated with multiple, sequential data transfer data operations, thereby significantly increasing bus efficiencies in average throughput. The technique involves short-cutting the conventional arbitration and selection phases into a quick arbitrate and select phase, whereby the current SCSI target hosts an arbitration proceeding without the bus transitioning to a bus free phase. Specific features of the present invention, such as the hex value of a quick arbitration and select message, or the specific assertion timings of specific signals, may be embodied in a wide variety of ways without violating the spirit and scope of the present invention. For example, the quick arbitrate and select message may comprise any hex value between 23h and 80h which is presently undefined, so long as the message code of the QAS message is made known to QAS capable target devices. In addition, specific timing delays described in the illustrated embodiments are taken from the SCSI-2 specification and the SCSI-3 proposed protocol documentation. As will be well understood by those having skill in the art, specific timing values have been defined in order to accommodate older devices having tri-state outputs and include timing windows suitable for simple tri-state release. The protocol of the present invention may be modified to comprise suitably reduced timing windows, if the protocol is implemented by devices operating in accordance with active assertion and deassertion. It will also be apparent to those skilled in the art, that future SCSI protocols will necessarily have different timing and delay parameters and that these future timing and delay parameters are equally applicable to the technique of the present invention.

What is claimed is:

1. In an SCSI protocol in which peripheral devices arbitrate for control of an SCSI bus in order to communicate with a communication partner, a method for reducing arbitration, selection and reselection overhead, wherein a current target device is allowed to control transfer of bus ownership when the target device has completed a current task and is ready to release the bus, the method comprising:

configuring a device as a quick arbitration and select (QAS) capable device, such that QAS capable devices evaluate the contents of the SCSI bus during MESSAGE-IN phases in order to detect a QAS message code;

configuring a current target device to assert a QAS message code during a message-in phase;

placing target SCSI IDs onto the SCSI bus at the detection of a QAS message code, by all QAS capable devices;

evaluating SCSI IDs on the SCSI bus by the current target device, the current target device driving a new arbitration winner SCSI ID onto the bus;

deasserting a message-in phase signal by the current target device; and asserting SEL by the arbitration winning device, the winning device further asserting its own SCSI ID and the SCSI ID of its desired communication partner onto the SCSI bus.

2. The method according to claim 1, wherein each peripheral device is identified as capable of operating in accordance with the QAS protocol by entering a device configuration identifier in a mode parameter page.

3. The method according to claim 2, the method including the step of configuring the SCSI bus to operate in QAS mode by initiating a MODE SELECT operation, an initiator device indicating the mode parameter page containing the QAS identifier.

4. The method according to claim 3, wherein the QAS message code comprises a message code value between 23h and 80h.

5. The method according to claim 4, further comprising an initiator preemption step, including:

preempting a QAS phase by asserting ATN along with an initiator SCSI ID;

indicating that an initiator wishes to drive a message-out phase requiring an immediate response by the current target device; and wherein ATN is asserted as a broadcast command, requiring all target devices to remove their SCSI IDs from the SCSI bus, thus leaving only initiator IDs on the bus, such that only initiators participate in a subsequent arbitration and selection step.

* * * * *